UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYESTUFF.

985,770.

Specification of Letters Patent. Patented Mar. 7, 1911.

No Drawing. Application filed June 18, 1910. Serial No. 567,689.

*To all whom it may concern:*

Be it known that we, WILHELM BAUER, residing at Vohwinkel, and ALFRED HERRE and RUDOLF MAYER, residing at Elberfeld, Germany, citizens of the German Empire, have invented new and useful Improvements in New Vat Dyestuff, of which the following is a specification.

Our invention relates to the manufacture and production of new and valuable vat dyestuffs. They are obtained by condensing beta-naphthisatin derivatives containing more than one halogen atom in which the oxygen of the alpha-keto group is replaced by easily movable or replaceable substituents, e. g. halogen, sulfur, the amino group, the alkoxy group with a para-substituted alpha-naphthol, especially 4-ethoxy-1-naphthol, 4-bromo-1-naphthol, 4-chloro-1-naphthol.

The new dyes are in a dry state dark blue crystalline powders with a metallic luster which are soluble in hot nitrobenzene generally with a blue coloration, and which yield with hydrosulfite and caustic soda lye generally yellow vats dyeing cotton after exposure to air blue-gray to black shades remarkable for their fastness to chlorin.

In order to illustrate the new process more fully we can proceed as follows, the parts being by weight:—355 parts of dibromo-beta-naphthisatin are converted into the alpha-chlorid by heating them with 220 parts of $PCl_5$ and 3500 parts of dry chlorobenzene. The mixture thus obtained is then added to a warm solution, which is well stirred, of 250 parts of 4-bromo-1-naphthol in 1500 parts of dry chlorobenzene; stirring is continued for 12 hours. After cooling the dye is filtered off and washed with benzene and ether. It is a dark blue crystalline powder with a copper luster soluble in concentrated sulfuric acid with a greenish dark blue color, scarcely soluble in hot benzene with a blue color, soluble in hot nitrobenzene with a greenish-blue color. It forms a yellow vat with hydrosulfite and caustic alkali, from which cotton is dyed after exposure to air in fast grayish-blue to black shades.

Dichloro-beta-naphthisatin and higher halogenated beta-naphthisatins furnish similar products.

We claim:—

1. The herein described new dyestuffs obtainable from a halogenated beta-naphthisatin derivative containing more than one halogen atom in which the oxygen of the alpha-keto group is replaced by easily movable or replaceable substituents and a para-substituted alpha-naphthol, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air from grayish-blue to black shades remarkable for their fastness to chlorin, substantially as described.

2. The herein described new dyestuff obtainable from dibromo-beta-naphthisatin-alpha-chlorid and 4-bromo-1-naphthol, which dyestuff is in a dry state a dark blue crystalline powder with a copper luster, soluble in concentrated sulfuric acid with a dark greenish-blue color, and which yields with hydrosulfite and caustic soda lye a yellow vat from which cotton is dyed a grayish-blue to black remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
OTTO KÖNIG,
CHAS. J. WRIGHT.